INVENTORS
CHARLES H. WRIGHT
CHARLES E. NELSON
BY
Thomas W. Brennan
AGENT

United States Patent Office 3,507,148
Patented Apr. 21, 1970

3,507,148
ASSEMBLY FOR SEALING THRUST NOZZLE
TO EXHAUST DIFFUSER
Charles H. Wright, Brigham City, Utah, and Charles E. Nelson, Redlands, Calif., assignors to Thiokol Chemical Corporation, Bristol, Pa., a corporation of Delaware
Filed Oct. 27, 1967, Ser. No. 680,613
Int. Cl. G01m 15/00
U.S. Cl. 73—117.4                    24 Claims

ABSTRACT OF THE DISCLOSURE

A rocket motor test apparatus wherein an exhaust diffuser, utilized to reduce nozzle back pressure during static testing, is adapted with a unique seal between it and the nozzle being tested to prevent air aspiration therein, while simultaneously permitting true thrust measurement of said motor.

---

This invention relates to rocket motor test apparatus and more particularly to a seal between an exhaust diffuser and a rocket motor thrust nozzle disposed within said exhaust diffuser during thrust tests.

In the development of rocket motors, static tests are necessary to evaluate nozzle design and materials and to measure nozzle performance. For example, such testing may involve measuring motor axial thrust, heat transfer rates and nozzle erosion when the nozzle is flowing full; i.e., when exhaust gases contact the nozzle exit cone over its entire length. Such a condition cannot be achieved when exhausting a high expansion ratio nozzle into the atmosphere during a static test. Therefore, in testing a high expansion ratio nozzle an exhaust diffuser is frequently used to reduce nozzle back pressure sufficiently to allow the nozzle to flow full at design chamber pressure and to prevent flow separation in the divergent portion of the nozzle. For rocket nozzles having a very high expansion ratio (i.e., greater than about 20), it is necessary that the exhaust diffuser be attached to the rocket nozzle with a pressure-tight seal to prevent aspiration of air through the annular area between the nozzle and the exhaust diffuser. Heretofore, however, the use of a seal between a rocket nozzle and an exhaust diffuser has caused inaccurate axial and transverse thrust measurements due to the transfer of undesirable loads between the nozzle and the exhaust diffuser.

The present invention provides a nozzle-to-diffuser seal which is designed to minimize resistance to relative transverse and axial motion between the nozzle and diffuser and which thus improves the accuracy of thrust measurements obtained from static firing of a rocket motor. The seal is uniquely formed so that the circle defining the center of the seal area has a diameter equal to the diameter of the nozzle exit plane. Flexibility of the seal is achieved by means of a generally U-shaped member, each leg of which is joined to a respective one of the nozzle and diffuser thus eliminating the need for consideration of unbalanced pressure loads in determining rocket motor thrust.

Accordingly, it is an object of this invention to provide a seal which will close the annular area between an exhaust diffuser and thrust nozzle of a rocket motor disposed within the exhaust diffuser for testing, and which will not transfer undesirable loads between the exhaust diffuser and the thrust nozzle and between the seal and the thrust nozzle.

Another object of this invention is to improve the accuracy of thrust measurements obtained from static tests of rocket motors when using exhaust diffusers.

In the following description of a preferred embodiment of the invention, reference is made to the accompanying drawings wherein.

Throughout the sepecification and drawings, like reference numbers designate like parts.

Figure 1:
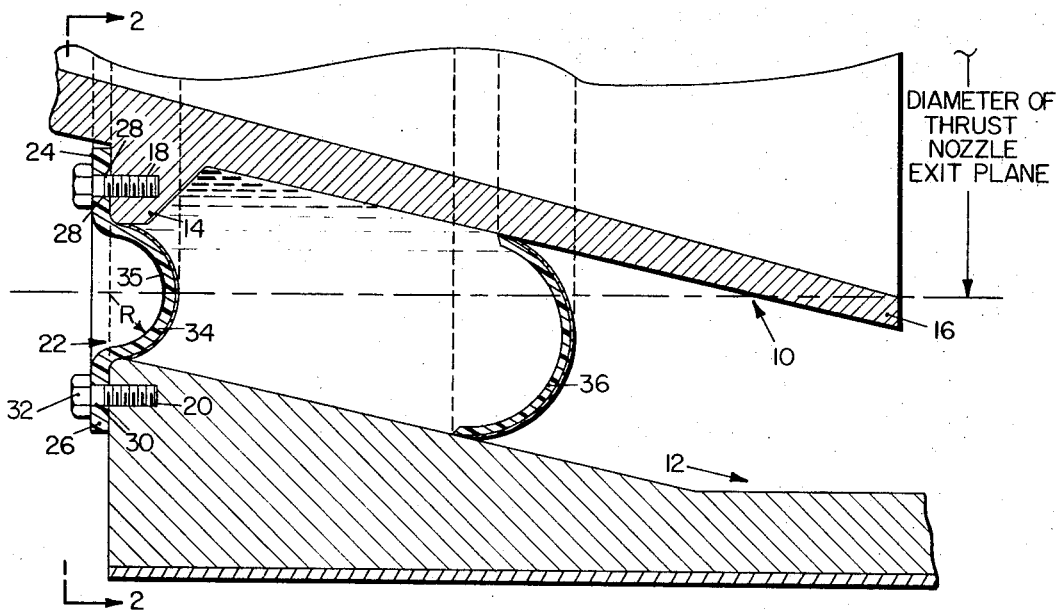
FIGURE 1 is a fragmentary, sectional view of a rocket motor thrust nozzle disposed within an exhaust diffuser, the annular area between the thrust nozzle and the exhaust nozzle being staled by the preferred embodiment.

As illustrated in FIGURE 1, a thrust nozzle 10 is disposed within an exhaust diffuser 12. A circumferential boss 14 extends around the exterior of thrust nozzle 10 in a plane forward of the thrust nozzle exit plane (the latter being the plane which passes through the end surface 16 of the thrust nozzle). A plurality of threaded holes 18 (only one of which is shown) are formed in boss 14 and equally spaced circumferentially thereof. Similarly, a plurality of threaded holes 20 (only one of which is shown) are formed in the end of exhaust diffuser 12 and equally spaced circumferentially thereof.

A seal 22, as shown in FIGURE 1, includes a pair of coplanar, concentric annular flange members, 24 and 26 respectively, each of which is formed with a plurality of holes 28, 30 aligned with respective ones of holes 18, 20. A plurality of bolts 32, only two of which are shown, hold flanges 24, 26 and thereby seal 22, in pressure-tight engagement against boss 14 and the end of exhaust diffuser 12 respectively. Bolts 28 and 32 will ordinarily be inserted over seal washers 28a and 32a respectively to insure adequate sealing therearound in practice.

Figure 2:
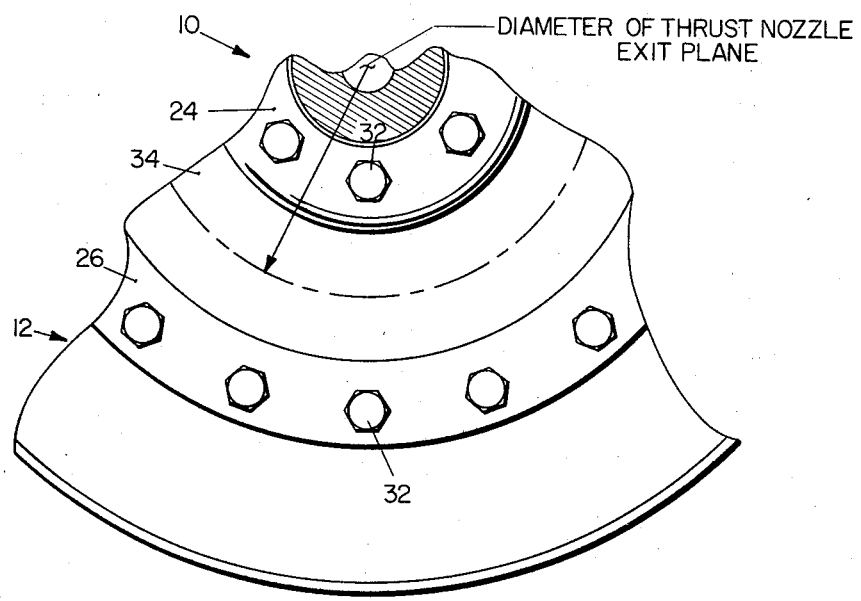
FIGURE 2 is a fragmentary view taken along line 2—2 in FIGURE 1 and in the direction indicated by arrows.

Seal 22 in the FIGURE 1 embodiment also includes a middle portion 34 substantially U-shaped in cross-section and each leg of which, as shown, is integrally joined to a respective one of flange members 24, 26. Middle portion 34 is formed so that the circle defining its center (i.e., a circle which lies in a plane perpendicular to the longitudinal axis of thrust nozzle 10 and about which the radius of curvature R rotates to define the inner surface 35) has a diameter equal to the diameter of the thrust nozzle exit plane (i.e., the diameter of the circle formed by the inner, aft edge of thrust nozzle 10). In the appended claims, this diameter is designated as the "diameter of the thrust nozzle exit plane." This diameter is represented by a broken line in FIGURE 2.

A shield 36 extends across the annular space between exhaust diffuser 12 and thrust nozzle 10. The purpose of this shield is to protect seal 22 from the dynamic load caused by the sudden pressure change which occurs when the rocket motor fires, and also to protect the seal from the heat of the exhaust gases from thrust nozzle 10. The space between seal 22 and shield 36 is filled with a packing material 13, preferably one capable of withstanding elevated temperature such as a silicone grease to protect the seal from shock and heat. Both the position and the configuration of shield 36 can be varied to meet the requirements of different tests. Generally, however, shield 36 is designed to reflect heat from its aft surface and to retain a requisite amount of heat resisting grease. As illustrated, this can be accomplished by an annular construction having an arcuate cross-section and formed of a maetrial having sufficient resilience to maintain a tight seal between its edges, thrust nozzle 10 and exhaust diffuser 12. Shield 36, though not a necessary part of this invention, does provide a means for accomplishing its purpose with increased reliability.

In a preferred embodiment, seal 22 is formed of silicone impregnated fiberglass with a backing of asbestos having aluminum foil on its aft side. Shield 36 is usually similarly constructed, although to insure against transmitting any load from nozzle 10 to diffuser 12, materials such as cardbard, heavy kraft paper and the like can advantageously be used. Other combinations of materials will occur to a skilled artisan using the invention.

A seal assembly constructed in accordance with this invention has been used during static test firing of a 156 inch diameter rocket motor. Erosion of the thrust nozzle exit cone during the firing necessitated consideration of some unbalanced seal loads in determining true thrust. However, because of the seal design the unbalanced load was only 1.2 percent of the measured thrust. If a conventional seal had been used, the unbalanced load would have been considerably higher.

Figure 3:
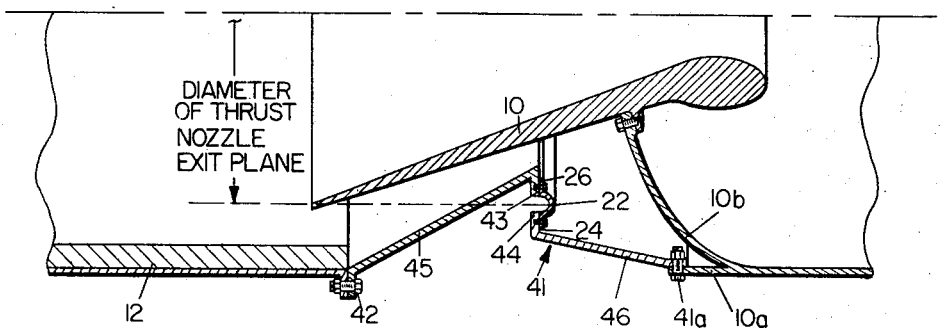
FIGURE 3 is a fragmenetary, sectional view of another embodiment of the invention.

Referring now to the FIGURE 3 embodiment, diffuser 12 is shown being connected to a typical rocket motor at the aft end skirt 10a of casing 10b. The casing 10b is attached at its head end to a motor test mount (not shown) which receives the thrust developed in the motor. A load cell or other thrust measuring device (also not shown) may be utilized to determine the motor thrust during test.

Nozzle 10, fixed to the aft end of motor casing 10b, is positioned in diffuser 12, having its outer, aft end, edges spaced apart from the inside walls thereof. Attached to skirt 10a in a joint 41a in overlapping relation therewith is a seal adaptor 41 which surrounds nozzle 10 in an intermediate portion thereof. Seal adapter 41 comprises two sections or pieces, an aft end section 45, peripherally attached to diffuser 12 by means of a plurality of clamping members or bolts 42, and a forward section 46 extending from joint 41a to the forward end of aft end section 45. Sections 45 and 46 are formed with radially outward and inward end flanges 43 and 44 respectively, to receive in bolted engagement therewith flange members 26 and 24 respectively of seal 22. From the above description it is seen that in this embodiment seal 22 functions as in the previous embodiment, but without directly contacting nozzle 10 thereby eliminating necessity for provision of boss 14 thereon. In addition by converging members 45 and 46 toward each other, the diametral relationship between seal 22 and the nozzle exit plane is easily maintained. Simultaneously, other advantages of the invention over the prior art, e.g., minimizing correction (for unbalanced seal loads) necessary to obtain true thrust from measured thrust, minimizing resistance to relative transverse motion between the rocket motor and the diffuser, minimizing resistance to relative axial motion between the rocket motor and the diffuser and achieving overall seal flexibility, are maintained. A further advantage not heretofore mentioned is that the unique placement of seal 22 protects it from the radiated heat of the exhaust plume. A still further advantage is increased convenience in assembly and disassembly of the device in practice.

Figure 4:
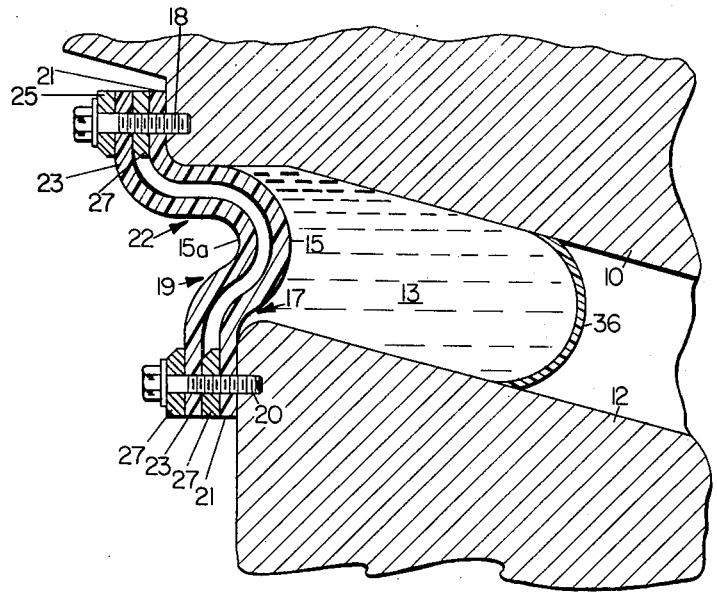
FIGURE 4 is a fragmentary, sectional view, similar to FIGURE 1, showing still another embodiment of the invention.

In FIGURE 4 is shown yet another embodiment of the invention wherein use of shield 36 is retained as in FIGURE 1. As stated hereinabove shield 36, though preferred in the form of impregnated fiberglass base material backed by asbestos and aluminum foil, is constructed so as to provide a means, across the annular space between diffuser 12 and nozzle 10, to contain the packing material 13. This can be accomplished best by constructing shield 36 of a non-load transmitting material such as carboard and the like but which still is sufficiently self-supporting to stay in place. Such a material is contemplated for use in this invention since it will accomplish the ends of containing the silicone grease packing material 13, and thereby protect seal 22 from dynamic loads caused by the sudden pressure change which occurs on start of the rocket motor of which nozzle 10 is a part, and to aid in protecting seal 22 from the heat of the motor exhaust gases.

In FIGURE 4 seal 22 is constructed in a dual sealing arrangement, to insure greater service reliability, comprising a primary seal member 17 and a redundant member 19. Seal members 17 and 19 each comprise a middle portion 15 and 15a respectively, which extend across the annular space between nozzle 10, boss 14 and diffuser 12. Seal members 17 and 19 each further comprise a pair of annular flanges 21 and 23 respectively, which are clamped to boss 14 and diffuser 12 between the pairs of annular clamping rings 25 and 27 by a plurality of threaded screws or bolts in threaded holes 18 and 20. Use of seal 22 in this arrangement insures continued high reliability by providing for greater seal strength without significant sacrifice of flexibility. As shown in FIGURE 4 seal 22 thereof is in its operative position wherein thrust of the motor (FIGURE 3) is exerting an aftward motion to nozzle 10 and seal 22 with respect to diffuser 12.

It is, of course, evident that in the preferred embodiment of FIGURE 1, seal members 24 and 26 can also be clamped to boss 14 and diffuser 12 by means of a single pair of rings 25 and 27 should it be desired to install seal 22 in a nondirect contacting manner. Such installation is in fact contemplated, and in general practice is usually recommended, in the use of this invention as a part thereof.

While only a preferred and two additional embodiments have been described and illustrated, it will be understood that various modifications and changes may be made within the scope of the invention. Therefore, it is intended that limitations to be imposed on the inventive scope herein set forth is to be done only in light of the subtended claims.

What is claimed is:

1. In a rocket motor test apparatus comprising: a rocket motor thrust nozzle and a diffuser, a portion of said nozzle coaxially disposed within said exhaust diffuser, a seal comprising at least one pair of annular flange members, said flange members being sealingly peripherally disposed about the exterior of said thrust nozzle and attached to said exhaust diffuser respectively, and a middle portion substantially U-shaped in cross-section each leg of which is joined to a respective one of said flange members, said middle portion being formed so that the circle defining its center has a diameter equal to the diameter of the thrust nozzle exit plane.

2. A seal assembly as defined in claim 1 wherein said seal further includes, in combination therewith, a shield aftwardly positioned from said U-shaped portion and extending across said annular space between said exhaust diffuser and said thrust nozzle and defining with said U-shaped member a substantially annular space for containing a heat resistant material.

3. The seal assembly of claim 1 wherein said flange members of said seal are attached to said diffuser and said nozzle by a pair of annular clamping rings.

4. The seal of claim 1 wherein the flange members, U-shaped portion and legs thereof are contiguous laminations of silicone impregnated fiberglass, asbestos and aluminum foil.

5. The seal of claim 1 wherein the flange members, U-shaped portion and legs thereof are contiguous and fabricated of silicone rubber.

6. The seal of claim 1 wherein the flange members, U-shaped portion and legs thereof are contiguous and fabricated of acrylonitrile rubber.

7. The seal of claim 2 wherein the heat resistant material is a silicone grease.

8. The seal of claim 2 wherein the shield is cardboard.

9. In a rocket motor test apparatus comprising: a rocket motor thrust nozzle coaxially disposed within and spaced from the wall of an exhaust diffuser, a seal assembly comprising a pair of annular flange members, said flange members being fixedly attached to the exterior of said thrust nozzle and to said exhaust diffuser respectively, a middle portion substantially U-shaped in cross-section and each leg of which is joined to a respective one of said flange members, said middle portion being formed so that the circle defining its center has a diameter equal to the diameter of the thrust nozzle exit plane, a shield extending across the annular space between said exhaust diffuser and said thrust nozzle and disposed between the thrust nozzle exit plane and said middle portion, and a heat resistant material filling the space between said shield and said middle portion.

10. The seal assembly of claim 9 wherein the heat resistant material is a silicone grease.

11. The seal assembly of claim 9 wherein said shield is a lamination of silicone impregnated fiberglass, asbestos and aluminum foil.

12. The seal of claim 9 wherein said shield is cardboard.

13. The seal of claim 9 wherein the shield is slicone rubber.

14. In a rocket motor test apparatus comprising: a rocket motor thrust nozzle subsequentially coaxially disposed within the walls of an exhaust diffuser, a seal assembly comprising at least two spaced apart, side by side seal members of flexible material each having a pair of flange members sealingly attached to the exterior of said thrust nozzle and to said diffuser respectively, a middle portion substantially U-shaped in cross-section each leg of which is joined to a respective flange member of said seal members, a first pair of annular clamping rings one of said pair positioned against one of said flange members and the other of said pair against the other flange member of one of said seal members and in spaced apart relationship to said seal member, a second pair of annular clamping rings one of said pair positioned against one of said flange members and the other of said pair against the other flange member of said other seal member, means for attaching said flange members and clamping rings to said nozzle and to said diffuser respectively, a shield aftwardly disposed with respect to said seal members across the annular space between said nozzle and said diffuser and a heat resisting material filling the space between said shield and said middle portion.

15. The seal assembly of claim 14 wherein the shield is a lamination of impregnated fiberglass, asbestos and aluminum foil materials.

16. The seal assembly of claim 14 wherein the seal members are laminations of silicone impregnated fiberglass, asbestos and aluminum foil.

17. The seal assembly of claim 14 wherein at least one of the seal members is formed of silicone rubber.

18. The seal assembly of claim 14 wherein the shield is cardboard.

19. The seal assembly of claim 14 wherein at least one of the seal members is formed of acrylonitrile rubber.

20. The seal assembly of claim 14 wherein the heat resisting material is a silicone grease.

21. In a rocket motor test apparatus said rocket motor having a casing including aft and head end skirts comprising: a thrust nozzle and a diffuser, a portion of said nozzle coaxially disposed within said diffuser, a two-section seal adaptor circumferentially disposed about said motor forwardly of said diffuser and longitudinally extending toward the forward end of said nozzle sealingly connecting said aft end casing skirt to said diffuser said adaptor sections circumferentially disposed about said nozzle and having overlapping spaced apart ends, a flexible seal comprising a pair of flange members, said flange members being sealingly, peripherally disposed about the exterior of said thrust nozzle and joined to said overlapping ends of said seal adaptor, and middle portion substantially U-shaped in cross-section each leg of which is joined to a respective one of said flange members, said middle portion being formed so that the circle defining its center has a diameter equal to the diameter of the thrust nozzle exit plane.

22. The seal of claim 21 wherein said flange members, U-shaped portion and legs thereof are contiguous laminations of silicone impregnated fiberglass, asbestos and aluminum foil.

23. The seal of claim 21 wherein said flange members, U-shaped portion and legs thereof are contiguous and fabricated of silicone rubber.

24. The seal of claim 21 wherein said flange members, U-shaped portion and legs thereof are contiguous and fabriacted of acrylonitrile rubber.

References Cited

UNITED STATES PATENTS

| | | | |
|---|---|---|---|
| 3,109,284 | 11/1963 | Ashwood | 239—265.33 X |
| 3,182,452 | 5/1965 | Eldred | 239—265.15 X |
| 3,280,563 | 8/1966 | Bowersett | 293—265.35 X |

RICHARD C. QUEISSER, Primary Examiner

J. W. MYRACLE, Assistant Examiner

U.S. Cl. X.R.

239—256.11